US012494312B2

(12) United States Patent
Wastling et al.

(10) Patent No.: US 12,494,312 B2
(45) Date of Patent: Dec. 9, 2025

(54) FAST-ACTING TOGGLING ARMATURE USES CENTRING SPRING

(71) Applicant: Cheesecake Energy LTD, Nottingham (GB)

(72) Inventors: Michael Wastling, Nottingham (GB); Seamus Garvey, Nottingham (GB); Samuel Roberts, Nottingham (GB); Michael Simpson, Nottingham (GB); Bruno Cardenas, Nottingham (GB); James Garvey, Nottingham (GB); Henry Cooke, Nottingham (GB); Henry Franklin, Nottingham (GB); Bharath Kantharaj, Nottingham (GB)

(73) Assignee: Cheesecake Energy LTD, Nottingham (GB)

( * ) Notice: Subject to any disclaimer, the term of this patent is extended or adjusted under 35 U.S.C. 154(b) by 25 days.

(21) Appl. No.: 17/920,635

(22) PCT Filed: Apr. 22, 2021

(86) PCT No.: PCT/IB2021/053349
§ 371 (c)(1),
(2) Date: Oct. 21, 2022

(87) PCT Pub. No.: WO2021/214718
PCT Pub. Date: Oct. 28, 2021

(65) Prior Publication Data
US 2023/0141997 A1 May 11, 2023

(30) Foreign Application Priority Data
Apr. 22, 2020 (GB) .................................... 2005894

(51) Int. Cl.
*F16K 31/06* (2006.01)
*F16K 31/00* (2006.01)
*H01F 7/02* (2006.01)
*H01F 7/08* (2006.01)

(52) U.S. Cl.
CPC ........... *H01F 7/081* (2013.01); *F16K 31/003* (2013.01); *F16K 31/0658* (2013.01); *H01F 7/02* (2013.01); *H01F 2007/086* (2013.01)

(58) Field of Classification Search
CPC ...... F16K 31/56; F16K 31/566; F16K 31/003; F16K 31/0658; F16K 2200/3051;
(Continued)

(56) References Cited

U.S. PATENT DOCUMENTS 2,875,507 A * 3/1959 Smith .................... H01F 41/024
29/605
3,202,886 A * 8/1965 Kramer .................. H01F 7/1615
335/254
(Continued)

FOREIGN PATENT DOCUMENTS

DE    19947850    5/2000
DE    19526681    6/2006

OTHER PUBLICATIONS

MAchine translation for , Examination Report for Brazilian Application No. BR112022021466-9, dated Dec. 27, 2024, 4 pages. (Year: 2024).*
(Continued)

*Primary Examiner* — Craig J Price
(74) *Attorney, Agent, or Firm* — Reinhart Boerner Van Deuren s.c.

(57) ABSTRACT

A translating actuator acting between two extreme positions defined by mechanical stops comprises: an armature mass movable relative to the armature body, a stiff armature spring set such that the natural resting position of the armature mass is close to the centre of travel between the two extreme positions and pair of latches with sufficient holding force that the armature mass can be held at either extreme position against the restoring force of the spring and can be released quickly relative to the natural period of (Continued)

vibration determined by the armature mass on the armature spring.

4 Claims, 5 Drawing Sheets

(58) Field of Classification Search
CPC .... F16K 2099/0071; H01F 7/081; H01F 7/02; H01F 2007/086; H01F 7/1623; H01F 7/1615; H01F 7/122; H01F 7/1646; H01F 2007/1669; H01F 7/088; H01F 7/124; F01L 9/20; F01L 1/16; F01L 1/462; F01L 2009/2151; F01L 2009/2146; F01L 2009/2148
USPC .............. 251/129.09, 129.1, 129.15, 129.16, 251/129.01, 65, 284; 123/90.11
See application file for complete search history.

(56) References Cited

U.S. PATENT DOCUMENTS

| | | | | |
|---|---|---|---|---|
| 3,772,540 A * | 11/1973 | Benson | ................ | H02K 41/065 310/34 |
| 4,422,060 A * | 12/1983 | Matsumoto | ............... | H01F 7/13 335/266 |
| 4,533,890 A * | 8/1985 | Patel | ..................... | H01F 7/1646 335/229 |
| 4,794,890 A | 1/1989 | Richeson, Jr. | | |
| 4,831,973 A | 5/1989 | Richeson, Jr. | | |
| 4,878,464 A * | 11/1989 | Richeson, Jr. | ....... | F02D 13/0215 123/90.11 |
| 4,883,025 A * | 11/1989 | Richeson, Jr. | ............ | F01L 1/16 361/194 |
| 4,908,731 A * | 3/1990 | Richeson, Jr. | ............ | F01L 9/20 361/194 |
| 4,928,028 A * | 5/1990 | Leibovich | ............. | H01F 7/1646 310/23 |
| 5,146,123 A * | 9/1992 | Yarr | ..................... | F02G 1/0435 310/152 |
| 5,339,777 A * | 8/1994 | Cannon | ............... | F15B 13/0402 123/90.11 |
| 5,389,844 A * | 2/1995 | Yarr | ...................... | H02K 35/02 310/152 |
| 5,647,311 A * | 7/1997 | Liang | ........................ | F01L 9/20 123/90.11 |
| 5,692,463 A * | 12/1997 | Liang | ........................ | F01L 9/20 123/90.11 |
| 5,730,091 A * | 3/1998 | Diehl | ........................ | F01L 9/20 123/90.11 |
| 5,748,433 A * | 5/1998 | Schrey | .................. | F02D 41/20 123/90.11 |
| 5,765,513 A * | 6/1998 | Diehl | ........................ | F01L 9/20 123/90.11 |
| 5,769,043 A * | 6/1998 | Nitkiewicz | ............... | F01L 1/46 123/90.11 |
| 5,813,653 A * | 9/1998 | Esch | ........................ | F01L 9/20 335/266 |
| 5,875,746 A * | 3/1999 | Izuo | ......................... | F01P 3/12 123/193.5 |
| 5,991,143 A * | 11/1999 | Wright | ..................... | F01L 9/20 361/187 |
| 6,039,014 A | 3/2000 | Hoppie | | |
| 6,119,966 A * | 9/2000 | Wagner | ............. | F02M 63/0036 239/585.1 |
| 6,125,803 A * | 10/2000 | Hattori | .................. | H01F 7/1638 335/262 |
| 6,274,954 B1 * | 8/2001 | Gander | ..................... | F01L 9/20 310/17 |
| 6,276,318 B1 * | 8/2001 | Yanai | ........................ | F01L 9/20 123/90.11 |
| 6,286,478 B1 * | 9/2001 | Atago | ................. | F02D 13/0207 123/90.11 |
| 6,308,667 B1 * | 10/2001 | Tsai | ........................ | F01L 9/20 123/90.11 |
| 6,321,700 B1 * | 11/2001 | Hein | .................. | F02D 35/0007 123/90.11 |
| 6,322,048 B1 * | 11/2001 | Gramann | ................ | H01F 7/127 251/129.1 |
| 6,334,413 B1 * | 1/2002 | Hattori | ...................... | F01L 9/20 123/90.11 |
| 6,390,039 B2 * | 5/2002 | Fuwa | ........................ | F01L 9/20 123/90.11 |
| 6,633,157 B1 * | 10/2003 | Yamaki | .................. | G01D 5/145 123/90.11 |
| 6,634,327 B2 * | 10/2003 | Yanai | ........................ | F01L 9/20 123/90.11 |
| 6,763,789 B1 * | 7/2004 | Liang | ........................ | F01L 9/20 335/229 |
| 6,791,442 B1 * | 9/2004 | Schmidt | ................ | H01F 7/1615 335/266 |
| 6,805,079 B1 * | 10/2004 | Brehob | ..................... | F01L 9/20 123/90.11 |
| 6,810,841 B1 * | 11/2004 | Peterson | ................... | F01L 9/20 251/129.05 |
| 6,938,591 B2 * | 9/2005 | Fuwa | ........................ | F01L 9/20 123/90.11 |
| 6,956,453 B2 * | 10/2005 | Osterberg | ............... | H01F 7/145 335/229 |
| 7,014,167 B2 * | 3/2006 | Fuwa | ........................ | F01L 9/20 123/90.11 |
| 7,099,136 B2 * | 8/2006 | Seale | ........................ | F01L 9/20 123/90.11 |
| 7,111,595 B2 * | 9/2006 | Sedda | ........................ | F01L 9/21 123/90.11 |
| 7,121,240 B2 * | 10/2006 | Tani | ........................ | F01L 1/352 123/90.11 |
| 7,255,074 B2 * | 8/2007 | Han | ........................ | F01L 9/20 123/90.11 |
| RE39,851 E * | 9/2007 | Ogiso | ................. | F02D 13/0207 123/90.11 |
| 7,284,514 B2 * | 10/2007 | Grider | ................. | F02D 13/0253 123/90.11 |
| 7,367,296 B2 * | 5/2008 | Degner | ................. | H01F 7/1816 123/90.11 |
| 7,481,415 B2 * | 1/2009 | Reinicke | ............... | H01F 7/1615 251/129.1 |
| 7,511,475 B2 * | 3/2009 | Maerky | ............... | F16K 37/0033 123/90.11 |
| 7,540,264 B2 * | 6/2009 | Degner | ..................... | F01L 9/20 123/90.11 |
| 7,798,110 B2 * | 9/2010 | Sedda | ..................... | H01F 7/081 123/90.11 |
| 7,823,548 B2 * | 11/2010 | Winstead | .................. | F01L 9/20 123/90.11 |
| 7,841,309 B2 | 11/2010 | Greudl et al. | | |
| 7,898,122 B2 * | 3/2011 | Andrieux | ............... | H01F 7/1646 310/34 |
| 8,228,149 B2 * | 7/2012 | Puth | ...................... | H01F 7/1615 335/229 |
| 8,517,334 B2 | 8/2013 | Shiao et al. | | |
| 8,736,128 B2 * | 5/2014 | Dede | ........................ | H02K 1/08 310/191 |
| 9,293,243 B2 * | 3/2016 | Kim | ...................... | H01F 7/1615 |
| 10,593,493 B2 * | 3/2020 | Takasuka | ........... | H01H 33/6662 |
| 2008/0163835 A1 * | 7/2008 | Winstead | ..................... | F01L 9/20 123/90.11 |
| 2015/0211190 A1 * | 7/2015 | Harra | ........................ | E01B 9/02 238/310 |
| 2016/0169409 A1 * | 6/2016 | Beck | ........................ | F16K 35/16 251/65 |

OTHER PUBLICATIONS

International Search Report for International Application No. PCT/IB2021/053349, dated Oct. 11, 2021, 4 pages.
European Search Report for European Application No. 21739427.9, dated Nov. 6, 2024, 8 pages.

(56) References Cited

OTHER PUBLICATIONS

Examination Report for Brazilian Application No. BR112022021466-9, dated Dec. 27, 2024, 4 pages.

* cited by examiner

FAST-ACTING TOGGLING ARMATURE USES CENTRING SPRING

CROSS-REFERENCE TO RELATED PATENT APPLICATIONS

This application is a National Stage entry of International Application No. PCT/IB2021/053349, filed on Apr. 22, 2021, which claims priority to United Kingdom Application No. 2005894.7, filed on Apr. 22, 2020, both of which are incorporated herein by reference in their entireties.

FIELD OF THE INVENTION

In its most general form, this invention has potential application in almost every field where a solenoid is presently used or could be used. The applications of interest require an armature to be moved quickly and reversibly between two discrete positions.

The present invention is motivated initially by the controlled actuation of poppet-valves for use in internal-combustion engines, reciprocating gas compressors, reciprocating gas expanders and other machines where poppet-valves are used to open and close a communication channel between any two gas volumes (usually a "cylinder" and a "manifold").

The invention is especially suited to poppet valves serving a duty where no significant forces arise from pressure differences between the two gas volumes tending to cause the poppet valve to open. In a machine designed to be a reversible reciprocating compressor or expander, the poppet valve sited between the lower-pressure manifold and the cylinder would open inwards like the poppet valves found in nearly all present-day internal combustion engines but the poppet valve sited between the higher-pressure manifold and the cylinder would open outwards since the cylinder pressure would normally hover between the pressures in the manifolds.

BACKGROUND TO THE INVENTION

For the purposes of clarity, the background to this invention is presented in the context of poppet-valve actuation though the concept itself has wider applicability.

Many reciprocating machines use poppet-valves to determine when there is and when there is not a continuous communication between two gas volumes. The most familiar example is the internal combustion (IC) engine. The same poppet-valve arrangement is common to both diesel and petrol engines.

In the original designs of engines, and indeed in most present-day IC engines, poppet-valves are opened by cams rotating with cam-shafts and the valves are caused to return to their closed position by a spring. These arrangements have two strong disadvantages: (1) there are quite high levels of power loss associated with the actuation of the valve and (2) it is very difficult to vary the angles at which the valve opens and closes in a controlled way.

The high loss levels in these conventional designs arise because the cam action injects significant force against the valve whilst opening it (doing significant work). Then the return spring pushes the valve back to the closed position. In both opening and closing direction, there is normally a high contact force between the top of the valve and the cam and this contact force has associated friction which in turn causes loss.

Considerable effort has been expended in the automotive industry to increase the flexibility of cam-driven valve actuation in IC engines, through variation of timing, lift and dwell by adding mechanisms to the camshaft or its drive. However, the means to achieve these changes dramatically increase the complexity of the cam system. Examples include hydraulic and electro-mechanical actuators to adjust the phase of the camshaft relative to the crankshaft, variable eccentric drives to increase or decrease the time spent on a high point of the cam lobes, and switching between multiple cam profiles on a single shaft. Despite their cost and complexity, these solutions cannot achieve fully variable operation, offering either continuous variation over a limited range or a number of discrete operation profiles.

The present invention aims to at least partially ameliorate some of the above-mentioned problems.

SUMMARY OF THE INVENTION

According to an aspect of the present invention there is provided a translating actuator acting between two extreme positions defined by mechanical stops comprises: an armature mass movable relative to the armature body, a stiff armature spring set such that the natural resting position of the armature mass is close to the centre of travel between the two extreme positions and pair of latches with sufficient holding force that the armature mass can be held at either extreme position against the restoring force of the spring and can be released quickly relative to the natural period of vibration determined by the armature mass on the armature spring.

In embodiments, the latches may be realised magnetically, held in place by magnetic flux driven by permanent magnet material and releasable very quickly by a pulse of current creating a pattern of magneto-motive force opposing that provided by the permanent magnet material.

In a second aspect, there is provided an actuation system for a poppet valve based on the translating actuator of the first aspect, and in which the poppet valve is an integral part of the armature mass and in which the pressure difference maintained by the poppet valve at its closed position acts mainly or exclusively to hold the armature mass at that position against the restoring force of the spring.

The actuation system may be customised for operation at one specific frequency through the provision of acoustic chambers in the valve body housing such that the dynamic gas pressures within the actuation system do not significantly impede the motion of the armature mass.

Typically, valves that are actuated independently can offer the potential for better performance of the engine at conditions away from one single design point of operation and they also remove the power losses associated with friction between the cam and the top of the valve.

There are numerous arrangements for actively actuated valves. The majority are electro-hydraulic where a local hydraulic actuator fixed directly to the valve is powered by a remote hydraulic power source. Some utilise direct electrical (electromagnetic) actuation but these arrangements suffer from requiring relatively high volumes for the actuator. These large volumes are advantageous because the instantaneous forces required to accelerate the valve are extremely large.

To be most effective, valves should open and close relatively quickly. In the most ideal valve operations, the valve is opened at an instant when the pressure difference between the two discrete gas volumes is (close to) zero and the valve is closed at an instant when the volume flow rate between the two volumes is (close to) zero. These ideal opening and closing instants may occur at different angles of the crankshaft depending on the operating condition of the engine.

In embodiments, the present invention provides a poppet-valve actuation approach which:
  can draw all power from direct electrical actuation with no hydraulics involved
  allows valve opening and closing times to be controlled accurately
  provides for very rapid opening and closing of the valves
  avoids any strong impacts occurring at the ends of valve motion Expressed in broader terms, this invention may provide an actuation approach for fast-toggling armatures which:
  can draw all power from direct electrical actuation with no hydraulics involved
  allows the timing of the toggling transits to be controlled accurately
  provides for very rapid toggling transits
  avoids any strong impacts occurring at the ends of armature motion The basic principles of the invention are exposed first.

The poppet-valve may behave as a single discrete mass in a dynamic system.

We refer to this as the valve mass, m.

The valve mass typically has mechanical stops at the two extremes of its travel and these stops are a distance 2h apart. The stops lie at approximately +h and −h.

Each of the mechanical stops typically has a "latching mechanism" that can grab the valve mass when it has reached an extreme position and can release it an arbitrary time from rest at that extreme position.

The valve mass may be connected to ground via a valve spring with stiffness k. Note that a part of the valve spring moves with the valve mass whilst another part of the valve spring remains grounded. As such the valve spring itself makes some contribution to the valve mass itself but that contribution is significantly lower than the total mass of the valve spring as a separate object. In some embodiments, the valve spring may be realised as a multiplicity of individual springs operating as springs in parallel.

Each latching mechanism generally typically must have sufficient authority to prevent the valve mass from pulling away from the extreme when the valve spring is delivering its maximum level of force—attempting to pull the valve mass away towards the centre of travel.

The system may operate in four discrete modes which typically occur in a cyclic order:
  Valve mass latched low
  Valve mass in rising transit
  Valve mass latched high
  Valve mass in falling transit During periods where the valve mass is either latched low or latched high, the valve actuation system is fully quiescent and nothing is happening. A very desirable feature of the latching system is that it should consume no power to retain the latching force. Some details of a possible magnetic latching system are discussed in a later section where permanent magnets provide the magnetic flux that holds the valve mass in place.

During transits of the valve mass, the mass-spring combination can act like a single-degree-of-freedom (SDoF) system which has been released from a position that was a distance h away from the equilibrium position. If no latch acted subsequent to that release, the SDoF system would oscillate with an initial magnitude of h and with natural frequency $f_n = 1/2\pi\sqrt{(k/m)}$. In reality, because of parasitic losses in the SDoF system, the oscillations would gradually die down and the valve mass would ultimately settle at its equilibrium position.

The resonance frequency, $f_n$, is deliberately chosen to be much higher than the top speed of the engine. The time taken for the valve transit time is almost-exactly $1/(2f_n)$ and the profile of displacement of the valve mass closely resembles a single half-cycle of a cosine wave.

Generally no significant excitation is applied to the resonant mass during a valve-rising or valve-falling transit except that at the beginning of a transit, when one latch is being released, the expelling latch may actively push the valve mass away and at the end of a transit, the receiving latch will generally pull in the valve.

Ignoring parasitic losses, in any one transit, the net energy consumed is approximately zero. Specifically, there are no impacts. Impacts certainly do cause quanta of kinetic energy to be destroyed immediately so avoiding impacts is good for conserving energy.

The design process for this valve actuation system can be illustrated using a simple example. Suppose that the valve mass itself (including contribution from the valve spring) comprises m=200 g (0.2 kg) and that we wish the valve to achieve a total range of motion of 9 mm, i.e. $h=4.5\times10^{-3}$ (m). Suppose that the transit time required is approximately 2.5 ms. The natural frequency, $f_n$, is then calculated as $f_n$=200 Hz and the stiffness of the valve spring is then calculated as $k=0.2\times(2\pi\times200)^2$=315.8 kN/m. The force present in the valve spring at either extreme of its strain is 1.421 kN. The peak strain energy in the valve spring is 3.198 J and this is identical to the peak kinetic energy possessed by the valve mass as it traverses the mid travel point. The velocity of the valve mass at any such instant is 5.65 m/s.

We now describe some features of this invention.

An actuation system for a poppet valve is designed to facilitate the rapid transitioning of the valve between two discrete positions—normally corresponding to fully open and fully closed.

Within this system, the poppet valve itself acts as a discrete mass (the valve mass) that is connected to ground (the body of the machine containing the valve seating) via a valve spring. When there is no external force on the valve and if the valve was undergoing no acceleration, the valve spring would tend to locate the valve mass close to the centre of its travel.

The travel of the poppet valve between its two discrete positions is limited by mechanical stops. In one direction, that mechanical stop will normally be the poppet head itself coming into contact with the valve seat.

At each extreme of travel of the valve mass, there may be a latching provision capable of holding the valve at that extreme of its travel even in the presence of forces attempting to move the valve back towards the centre of travel.

The latching provisions are typically capable of releasing the latching force in a period of time that is short—even relative to the valve transit time. They are also capable of providing net positive work into the valve mass during any one valve transit in the sense that the work done by the receiving latch on the valve mass as it approaches the end of its transit is greater than the work done by the valve mass on the rejecting latch at the start of the transit.

The latching provisions may be implemented in the form of a quick-release magnetic latch where permanent magnet pieces incorporated into a magnetic circuit provide the magnetic flux that holds the latch closed and where the MMF present in those permanent magnet pieces is offset by an opposing MMF provided temporarily by coils present in the magnetic latch. The magnetic circuit in such a quick-release magnetic latch would be formed either from a ferromagnetic/ferrimagnetic material with a high electrical resistivity or it would be formed with internal geometry that naturally broke continuity of electrical paths so that eddy-currents would not significantly impede the rapid changes of magnetic flux required to release the latch quickly.

The valve spring may sometimes be implemented using one or more coil-springs but it is an important feature of this invention that the valve spring must be double-acting in the sense that in any single valve transit, the force in the valve spring changes from being fully upward to fully downward or vice-versa. It is also an important feature of this invention that minimising the total mass caused to travel is helpful in reducing either the time taken for a complete valve transit or the force capacity required in the latches (or both). With this in mind, there is a strong sensitivity about the mass of valve spring that effectively travels with the valve mass. The valve spring may therefore be realised as one or more planar springs serving jointly as valve stem guides to hold the valve stem on its intended centreline.

Embodiments where the Motion is Rotational Rather than Translational

There are many applications where the requirement is that an armature is rotated between two discrete positions rather than translated between two discrete positions. Exactly the same principles apply in the two different cases. Conceptually the only differences are that:

The armature mass (valve mass) is replaced by an armature inertia

The armature spring (valve spring) is a torsional spring in the rotational case

The upper and lower latches become latches at the two angular extremes of motion (most clockwise and most anti-clockwise).

Extensions to the Embodiments

One key concern with the present invention is that the valve mass should never find itself in equilibrium at the centre of its travel. A core intention is that once the valve mass has been released from the rejecting latch, it should overshoot that equilibrium position and reach almost to the opposite end of its travel where the receiving latch should pull it into the new locked position. Some strategy is necessary, however, to cater for the occasional possibility that the valve mass could end up at its equilibrium position at the centre of travel.

The magnetic latches are likely to have relatively little influence on the valve mass when that is close to the centre of its travel. One possibility for recovering this situation is to oscillate the "activation" of the two latches in turn and at a frequency close to the resonance frequency of the valve mass so that vibrations of the valve mass can build up and eventually those oscillations may become large enough to carry the valve mass over to one latched position.

A second possibility is that the valve mass might be equipped with some independent source of actuation. This independent actuation could take the form of piezo-electric strips stuck onto opposite faces of parts of a planar spring.

A third possibility that might be used in conjunction with the above two possible approaches is that a provision might be installed that would enable air (or the process gas) to flow through the semi-open valve at a high rate to accentuate the oscillations of the valve mass up to the point where it could be latched at one extreme of travel.

A separate consideration with the present invention is recoil. The valve actuation system proposed here exerts a very significant force on the body of the engine or machine for a very short period of time followed by the opposite force profile. There are two possible disadvantages to this if the body of the engine or machine is either relatively light or relatively flexible. These disadvantages are that (a) some significant noise may be created and (b) some of the energy intended for moving the valve across its intended traverse will leak out into the machine body. A solution to this problem is to use a symmetric system where two different masses with very similar values of the moving mass are actuated in opposition to each other. This provides the possibility of recoil-free operation.

This invention teaches a solution for the very common situation where a body (an armature) is required to alternate quickly between two positions at controllable times with dwell periods at each of the two positions. A specific case in point is a valve such as a poppet-valve where optimal performance of the host machine demands that the times taken for the poppet-valve to change from being fully-open to being fully-closed and vice-versa should be very short relative to the total cycle time of the piston in the cylinder. There are also applications in rotary valves, electrical switches, flow-control guides in production lines, points sets on railway tracks and other contexts. A spring attached to the armature and tending to centre that armature at (or close to) the middle of its travel clearly has the potential to be useful in delivering the required duty. This invention teaches that a system comprising the armature mass (or inertia), a centering spring and latching provisions at the extremes of the valve travel can be highly effective in achieving controllable and fast actuation. In this, all energy input is from electrostatic or electromagnetic actuation with no recourse to hydraulics and there are no strong impacts at the ends of armature motion.

These and other aspects of the invention will be apparent from, and elucidated with reference to, the embodiments described hereinafter.

DESCRIPTION OF THE FIGURES

Embodiments will be described, by way of example only, with reference to the drawings, in which.

Figure 1:
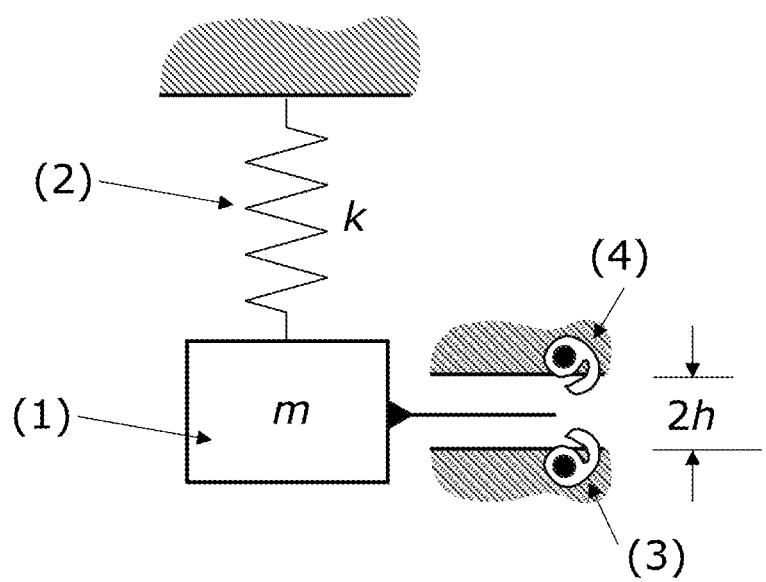
FIG. 1 shows the invention in schematic form.

It should be noted that the Figures are diagrammatic and not drawn to scale.

Relative dimensions and proportions of parts of these Figures have been shown exaggerated or reduced in size, for the sake of clarity and convenience in the drawings. The same reference signs are generally used to refer to corresponding or similar feature in modified and different embodiments.

The Generic Embodiment

FIG. 1 shows the invention in schematic form and exposes the four key elements required to realise this invention: the valve mass (1), the valve spring (2), the lower latch (3) which serves to hold the valve mass at the lower end of its travel and the upper latch (4) which serves to hold the valve mass at the upper end of its travel.

For improved clarity throughout the description of this invention, we focus on the application to poppet-valve actuation whilst recognising in general that a wider range of applications is possible. In wider applications, the valve mass (1) would simply be the armature mass and the valve spring would be the armature spring.

The lower and upper latches must each be able to release the valve mass extremely quickly and each one must be capable of doing more work attracting the valve mass towards it than is done against the latch as the valve mass is pulling away during a release event. The difference between these two work quantities must be sufficient to make up the small parasitic losses that inevitably happen during a valve transit event.

A First Embodiment

Figure 2:
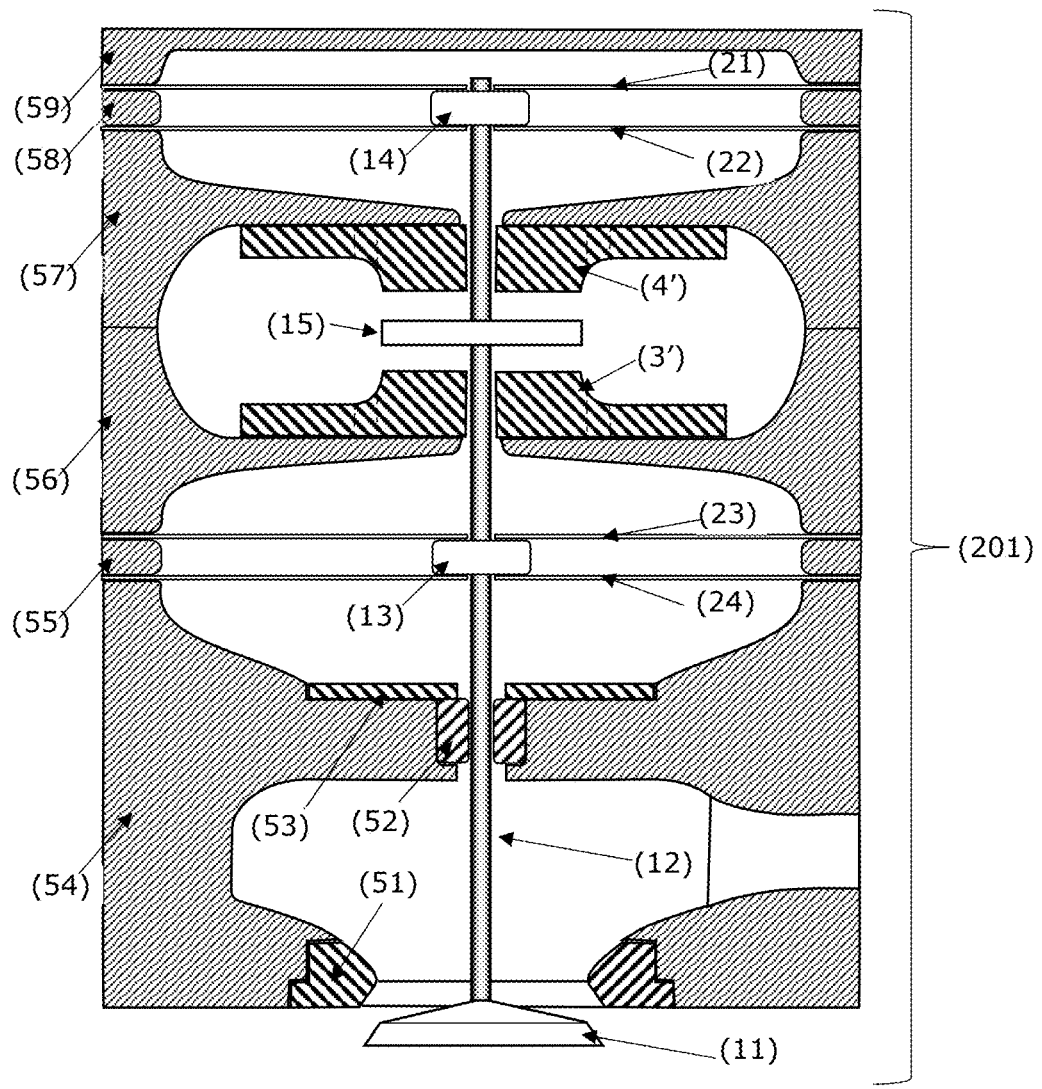
FIG. 2 shows a first embodiment of the invention.
Figure 3:
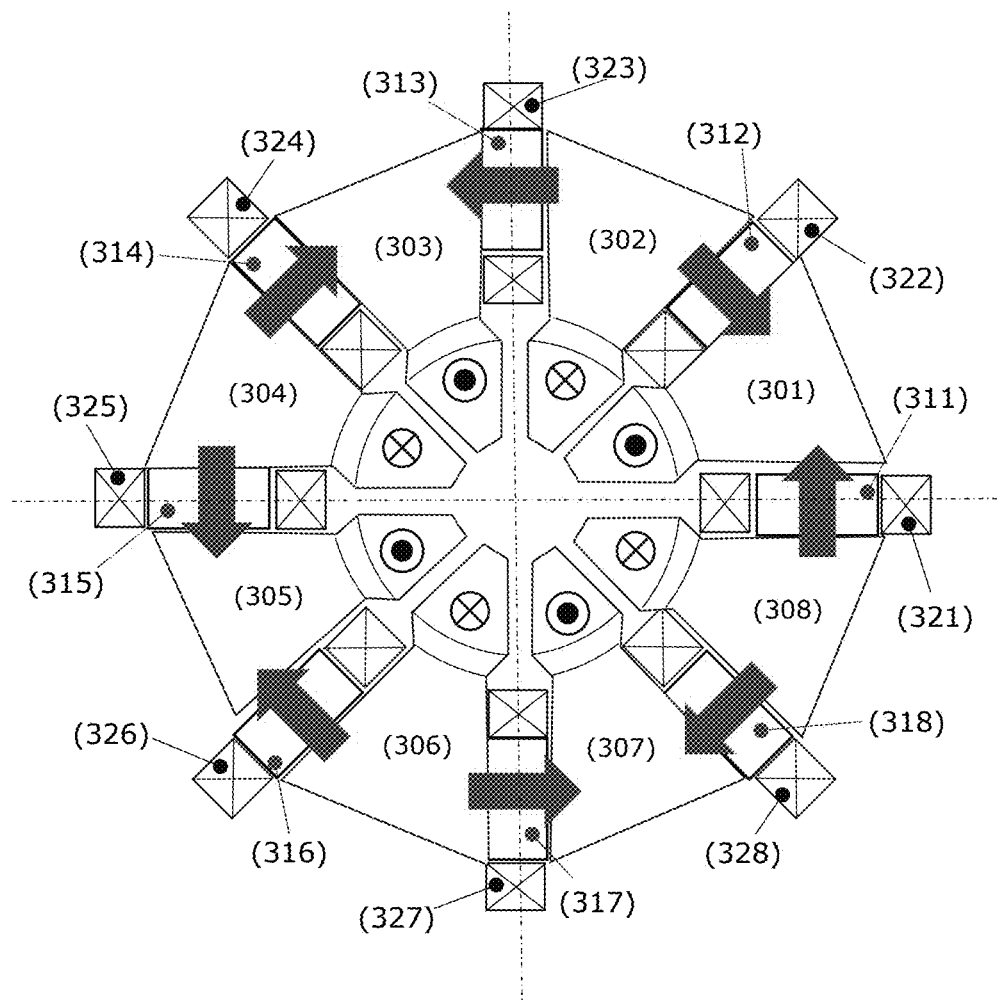
FIGS. 3 to 6 provide some detail of one possible configuration of magnetic latches that would serve the latch function required in this invention.
Figure 4:
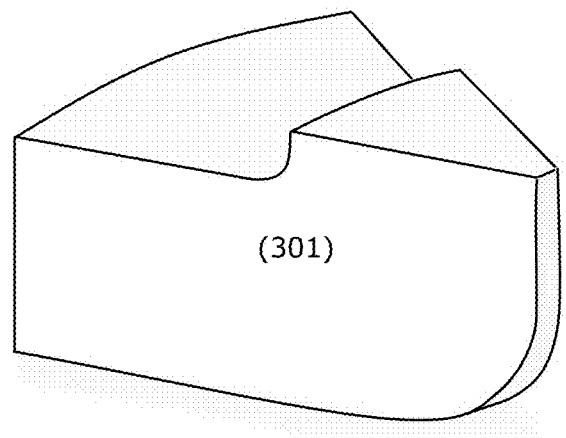
Figure 5:
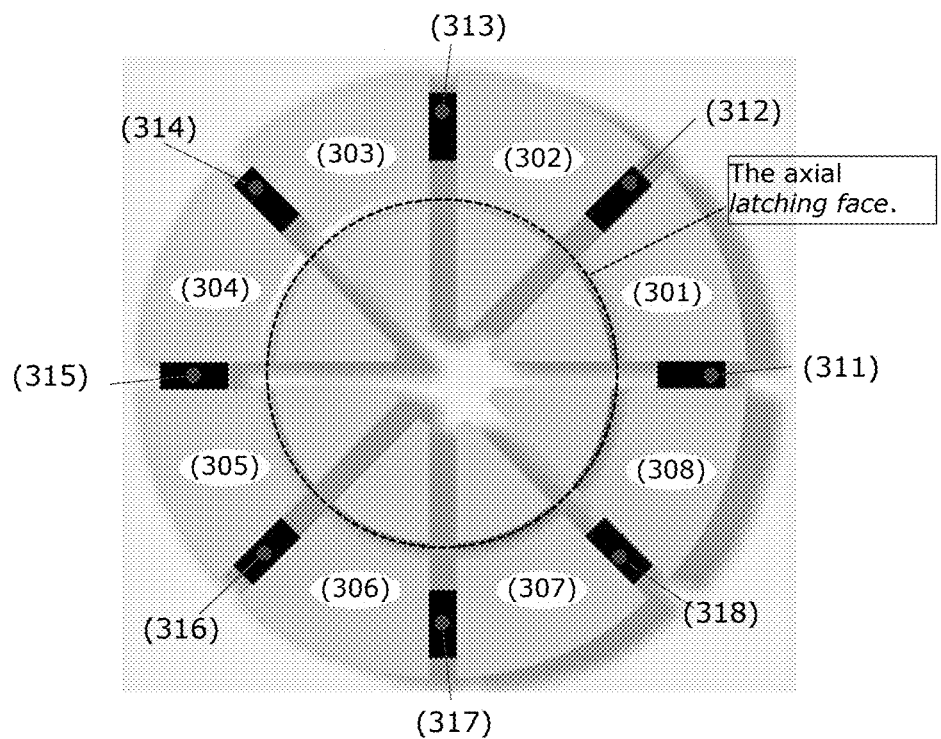

FIG. 2 shows a possible embodiment of actuator (201) following the schematic form of FIG. 1. In this embodiment, components (11), (12), (13), (14) and (15) are all elements of the valve mass (1). Correspondingly, components (21), (22), (23) and (24) all combine to form the valve spring (2). The lower latch (3') is shown as a single object in FIG. 2 but FIGS. 3-5 provide further insight into this. Similarly, the upper latch (4') is shown as a single object in FIG. 2 and its nature can be similar or identical to the nature of the lower latch. In FIG. 2, elements of the housing are numbered (51) through (59).

The valve mass comprises: the poppet head itself (11), the valve stem (12), a first stem-to-spring interface (13), a second stem-to-spring interface (14) and a target disc (15) that comprises ferromagnetic material and is configured (using either highly resistive material or else electrical continuity breaks) to be able to allow very rapid changes in flux through its axial faces.

The valve spring in this embodiment comprises four parallel planar springs—formed from spring steel sheet as will be described later: (21), (22), (23) and (24) respectively.

The body of the valve actuation system comprises the valve seat (51), a bush (52) to maintain alignment of the valve stem with the valve seat, a retaining plate (53) for the bush, a first main valve body piece (54), a second main valve body piece (55) that helps to secure two planar springs ((23) and (24)), a third main valve body piece (56) that carries the lower latch (3'), a fourth main valve body piece (57) that carries the upper latch (4'), a fifth main valve body piece (58) that helps to secure the remaining two planar springs ((21) and (22)) and finally a top piece of the valve body (59) that finally seals the valve chamber.

FIGS. 3-6 show that each the lower latch can be realised as a set of 8 individual ferromagnetic (or ferrimagnetic) pole pieces, (301)-(308), and 8 corresponding pieces of permanent magnet material, (311)-(318). In general, a magnetic latch of this generic configuration may be realised with any even number of pole pieces but 8 is a convenient number for illustration. Note that in this context, the terms ferromagnetic and ferrimagnetic are used to mean materials that are highly permeable to magnetic flux over a good range of flux densities (typically up to ~2 Tesla) and that do not have wide hysteresis loops. The term "soft magnetic material" could be used by some to indicate such material.

Corresponding to each separate piece of permanent magnet material, there is provided a coil, (321)-(328). When the coil is energised with current in one direction, the MMF produced by that coil opposes the MMF produced by the magnet. By this method, the magnetic latch can be released very quickly. All of the coils are connected together such that all of the permanent magnet MMF contributions are opposed simultaneously.

FIG. 3 shows the plan view of the lower latch and the direction of magnetisation of the permanent magnet pieces (311)-(318) is clear from the arrows presented in this image. In this figure, any one pole-piece has circumferential faces contacting two different pieces of permanent magnet material and those are magnetised in opposite circumferential senses. That is to say, if the piece of permanent magnet material on one side of a pole-piece is trying to drive flux in a clockwise direction (viewed from above), then the piece of permanent magnet material on the opposite side of that pole-piece is trying to drive flux in the counter-clockwise direction (viewed from above).

Figure 6:
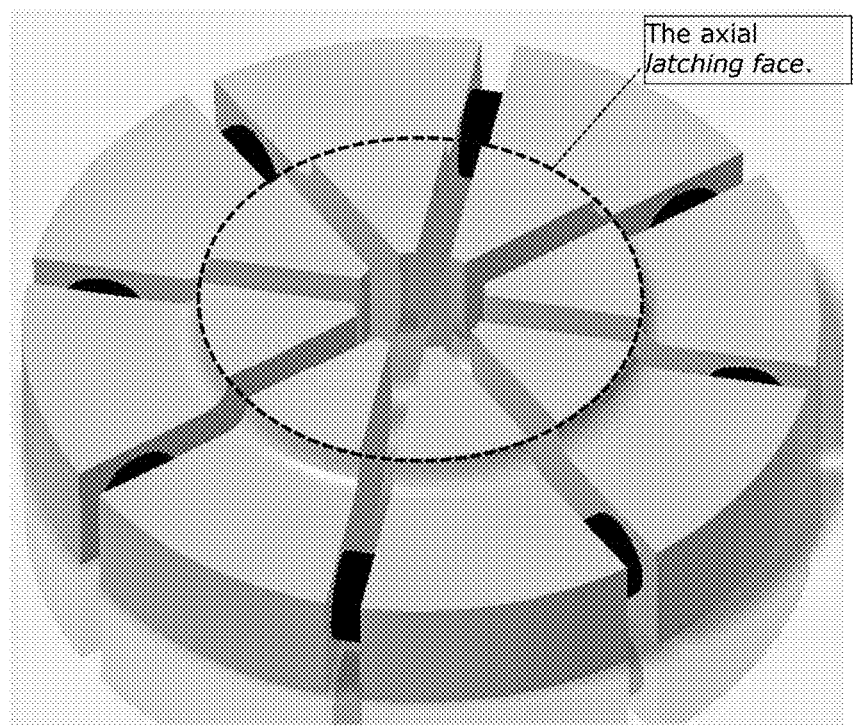

FIG. 4 shows an oblique view of a single pole-piece. FIG. 5 shows a second plan view of the lower latch with clearer indication of the axial face on this figure. The coils (321)-(328) are omitted from this view. FIG. 6 shows an oblique view of the assembled latch—again omitting to include the coils (321)-(328).

Figure 7:
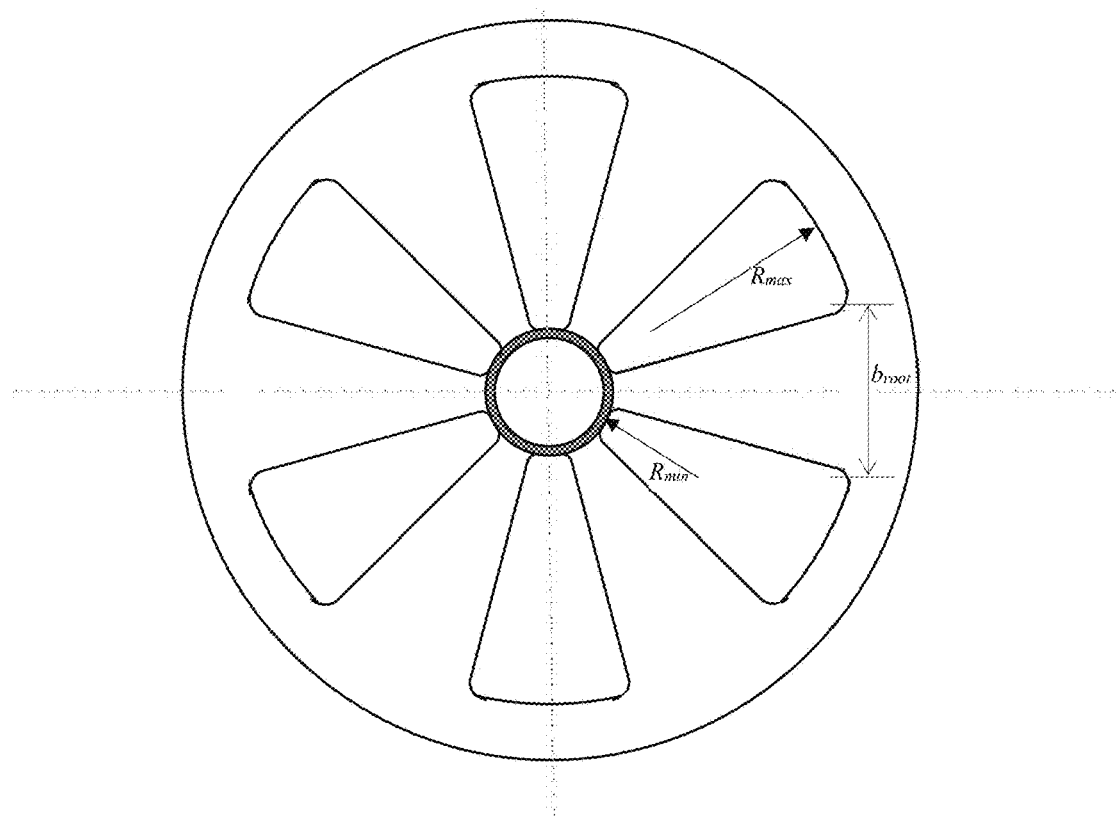
FIG. 7 shows a profile of a single plane of spring steel that can serve the combined functions of guiding the valve stem and providing a spring force that tends to drive the valve stem back towards the centre of travel.

FIG. 7 shows a view of a possible geometry of one of the planar springs (21)-(24). In this, the planar spring is formed by punching or laser-cutting or water-jetting features from a flat sheet blank. The "spokes" that remain connecting the outer annulus to the inner annulus are deliberately much wider close to the outer annulus than they are close to the inner annulus because the intention is that when the planar spring is deflected by its maximum amount, the slope of each "spoke" is close to zero at the outer annulus but is substantial at the inner annulus. In this way, strain energy is concentrated in spring material that does not move much and the main function of the spoke material close to the inner annulus is to transmit force.

From reading the present disclosure, other variations and modifications will be apparent to the skilled person. Such variations and modifications may involve equivalent and other features which are already known in the art and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A translating actuator acting with mechanical stops, said actuator comprising:
   a valve mass movable in relation with said mechanical stops, wherein the valve mass comprises a poppet head, a valve stem, stem-to-spring interfaces and a target disc, said target disc comprising ferromagnetic material and configured to allow rapid changes in flux through axial faces of the target disc;
   a valve spring acting on the valve mass, said valve spring having a resting position in relation with said mechanical stops, wherein the valve spring comprises four parallel planar springs;
   a lower magnetic latch for magnetically holding the valve mass at a lower end of travel using magnetic flux driven by permanent magnet material in the lower magnetic latch;
   an upper magnetic latch for magnetically holding the valve mass at an upper end of the travel using magnetic flux driven by permanent magnet material in the lower magnetic latch; and
   a valve body, said valve body comprising a valve seat, a bush for maintaining alignment of the valve stem with the valve seat, and a retaining plate for the bush and body pieces, each body piece for securing said four parallel planar springs or said upper and said lower magnetic latches;
   wherein each of said upper and said lower magnetic latch comprises ferromagnetic material, permanent magnet material, and a coil, said coil configured to be energised by a current to provide a magneto-motive force, wherein the magneto-motive force of the permanent magnet material opposes the magnetic force of said upper and said lower magnetic latch such that the latch is configured to release the valve mass in a time shorter than a natural period of vibration determined by the valve mass connected to the valve spring, wherein a profile of each of said upper and said lower magnetic latch comprises:
   a first plateau extending away from a central axis of the actuator;
   a ramp portion extending from the first plateau; and
   a second plateau extending from the ramp portion, wherein thickness of the pair of latches is greater along a length of the first plateau than along a length of the second plateau.

2. The translating actuator according to claim 1, wherein the lower magnetic latch comprises a plurality of pole pieces and corresponding pieces of permanent magnet material.

3. The translating actuator according to claim 2, wherein the plurality of pole pieces of permanent magnet material are aligned with an energising coil for operating the lower magnetic latch.

4. The translating actuator according to claim 1, wherein the upper and lower magnetic latches are formed from a material with a high electrical resistivity.

* * * * *